US011560880B2

(12) United States Patent
Li

(10) Patent No.: US 11,560,880 B2
(45) Date of Patent: Jan. 24, 2023

(54) HEAT RECOVER APPARATUS, SYSTEM AND METHOD OF USING THE SAME

(71) Applicant: Arizona Board of Regents on Behalf of the University of Arizona, Tucson, AZ (US)

(72) Inventor: Peiwen Li, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 608 days.

(21) Appl. No.: 16/321,718

(22) PCT Filed: Jul. 31, 2017

(86) PCT No.: PCT/US2017/044571
§ 371 (c)(1),
(2) Date: Jan. 29, 2019

(87) PCT Pub. No.: WO2018/023101
PCT Pub. Date: Feb. 1, 2018

(65) Prior Publication Data
US 2021/0277877 A1    Sep. 9, 2021

Related U.S. Application Data

(60) Provisional application No. 62/368,814, filed on Jul. 29, 2016.

(51) Int. Cl.
| F03G 7/06 | (2006.01) |
| F28D 20/00 | (2006.01) |
| F28F 9/02 | (2006.01) |
| F28D 7/16 | (2006.01) |
| F28D 21/00 | (2006.01) |
| F28D 17/00 | (2006.01) |
| F28D 19/02 | (2006.01) |
| C21B 3/08 | (2006.01) |

(52) U.S. Cl.
CPC ............. *F03G 7/06* (2013.01); *F28D 7/1615* (2013.01); *F28D 20/0056* (2013.01); *F28F 9/0275* (2013.01); *C21B 3/08* (2013.01); *C21B 2400/08* (2018.08); *F28D 17/005* (2013.01); *F28D 19/02* (2013.01); *F28D 2021/0045* (2013.01)

(58) Field of Classification Search
CPC .................. F28D 17/005; F28D 19/02; F28D 2021/0045; F28D 7/1615; F28D 20/0056; F03G 7/06; F28F 9/0275; C21B 3/08; C21B 2400/08
USPC ........................................................ 165/920
See application file for complete search history.

(56) References Cited

U.S. PATENT DOCUMENTS 2,606,861 A * 8/1952 Eastwood ................ C10G 9/30
                                                  422/216
2,703,225 A    3/1955 Cooper
(Continued)

*Primary Examiner* — Mickey H France
(74) *Attorney, Agent, or Firm* — Blank Rome LLP

(57) ABSTRACT

A heat recovery apparatus, system and method of using the same. The heat recovery apparatus includes a particulate inlet, a particulate distributor in fluid communication with the particulate inlet, a cavity in fluid communication with the particulate distributor, a plurality of pipes contained within the cavity and configured for transmission of a heat transfer fluid therethrough, and a particulate outlet in fluid communication with the cavity.

23 Claims, 7 Drawing Sheets

(56) References Cited

U.S. PATENT DOCUMENTS

| | | | | |
|---|---|---|---|---|
| 2,741,603 | A | * | 4/1956 | Fahnestock .............. B01J 8/087 |
| | | | | 422/223 |
| 4,479,353 | A | * | 10/1984 | Schluderberg ............ F01K 3/06 |
| | | | | 60/659 |
| 4,784,216 | A | * | 11/1988 | Bracegirdle ............ F26B 23/10 |
| | | | | 165/110 |
| 5,320,168 | A | * | 6/1994 | Haight .................... B01J 8/087 |
| | | | | 165/166 |
| 6,328,099 | B1 | | 12/2001 | Hilt et al. |
| 2008/0078699 | A1 | | 4/2008 | Carr |
| 2013/0180287 | A1 | * | 7/2013 | Rosenthal .............. C03B 3/023 |
| | | | | 65/29.16 |
| 2013/0312946 | A1 | | 11/2013 | Chan et al. |
| 2014/0026883 | A1 | | 1/2014 | Chen |
| 2016/0025417 | A1 | | 1/2016 | Byman |

\* cited by examiner

HEAT RECOVER APPARATUS, SYSTEM AND METHOD OF USING THE SAME

CROSS REFERENCE TO RELATED APPLICATIONS

This application is a U.S. national stage application based on International Application No. PCT/US2017/044571, which claims the benefit of U.S. Provisional Application Ser. No. 62/368,814, filed Jul. 29, 2016, both of which are hereby incorporated by reference in their entirety.

TECHNICAL FIELD

The application generally relates to heat recovery apparatuses, systems, and methods of using the same. In particular, the application relates to apparatuses, systems, and methods for the recovery of energy, in the form of heat, from high temperature solid particulate such as solar-heated sand or ceramic particles or matter produced during the smelting or refining of metal-containing ores.

BACKGROUND

Recently, there has been a growing interest in the use of particulate matter for energy storage. Generally, particulate matter such as sand or ceramic particles can be heated by an energy source. The heated particulate matter can then be stored in an insulated container and the energy can be subsequently transferred from the particulate matter to another system for future use. For example, recent work has focused on heating ceramic particles using concentrated beams of sunlight. Using concentrated beams of sunlight, such particulate matter can be heated to about 700° C. Systems and apparatuses that can efficiently convert the energy stored in such particulate matter to other forms of usable energy is highly desired.

While some forms of particulate matter can intentionally be heated for subsequent energy conversion applications, as with the ceramic particulate as described above, other particulate matter, having a high temperature and thus large amount of stored energy, can be made as a by-product during regular industrial practices. For example, during smelting or refining processes to purify metal-containing ores or crude metals, respectively, a large amount of high temperature molten slag is produced as a by-product. The slag by-product is then separated from the desired metal product and generally allowed to cool naturally in an open environment or with the aid of water. Upon cooling, the slag forms into a solid which may be a mixture of, for example, silicates, sulfides, chlorides, fluorides, and other chemical components or compositions. The solidified slag may then be granulated for use in the production of, for example, ballast, concrete or glass compositions.

During the cooling process, a considerable amount of energy is released from the slag. The above referenced natural or water cooling methods are not advantageous however because the heat (that is, energy) released during the cooling process is not recovered for later use. Molten slag can have a temperature ranging from about 1200° C. to about 1600° C. depending on the compositions of the ore to be purified and the produced slag. As energy is released from the molten slag, it will begin to solidify and can be granulated by, for example, agitation. In general, solidification and/or granulation of molten slag can take place at temperatures ranging from about 700° C. to about 1100° C., depending on the composition of the slag.

BRIEF DESCRIPTION OF THE DRAWINGS

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

DETAILED DESCRIPTION

The following detailed description refers to the accompanying drawings that depict various details of examples selected to show how the disclosed subject matter may be practiced. The discussion addresses various examples of the disclosed subject matter at least partially in reference to these drawings, and describes the depicted embodiments in sufficient detail to enable those skilled in the art to practice the disclosed subject matter. Many other embodiments may be utilized for practicing the disclosed subject matter other than the illustrative examples discussed herein, and structural and operational changes in addition to the alternatives specifically discussed herein may be made without departing from the scope of the disclosed subject matter.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "fluidically coupled" is defined as connected, either directly or indirectly through intervening components, for the transfer of one or more fluids, or solid particles or grains, between the so-described components. The term "fluid" is defined as a liquid, gas, or combination thereof. The term "fluid communication" is defined as the ability to transfer of one or more fluids, or solid particles or grains, between the so-described components. The term "substantially" is defined to be essentially conforming to the particular dimension, shape or other thing that "substantially" modifies, such that the component need not be exact. For example, substantially cylindrical means that the object resembles a cylinder, but can have one or more deviations from a true cylinder. The terms "comprising," "including" and "having" are used interchangeably in this disclosure. The terms "comprising," "including" and "having" mean to include, but are not necessarily limited to, the things so described.

Figure 1:
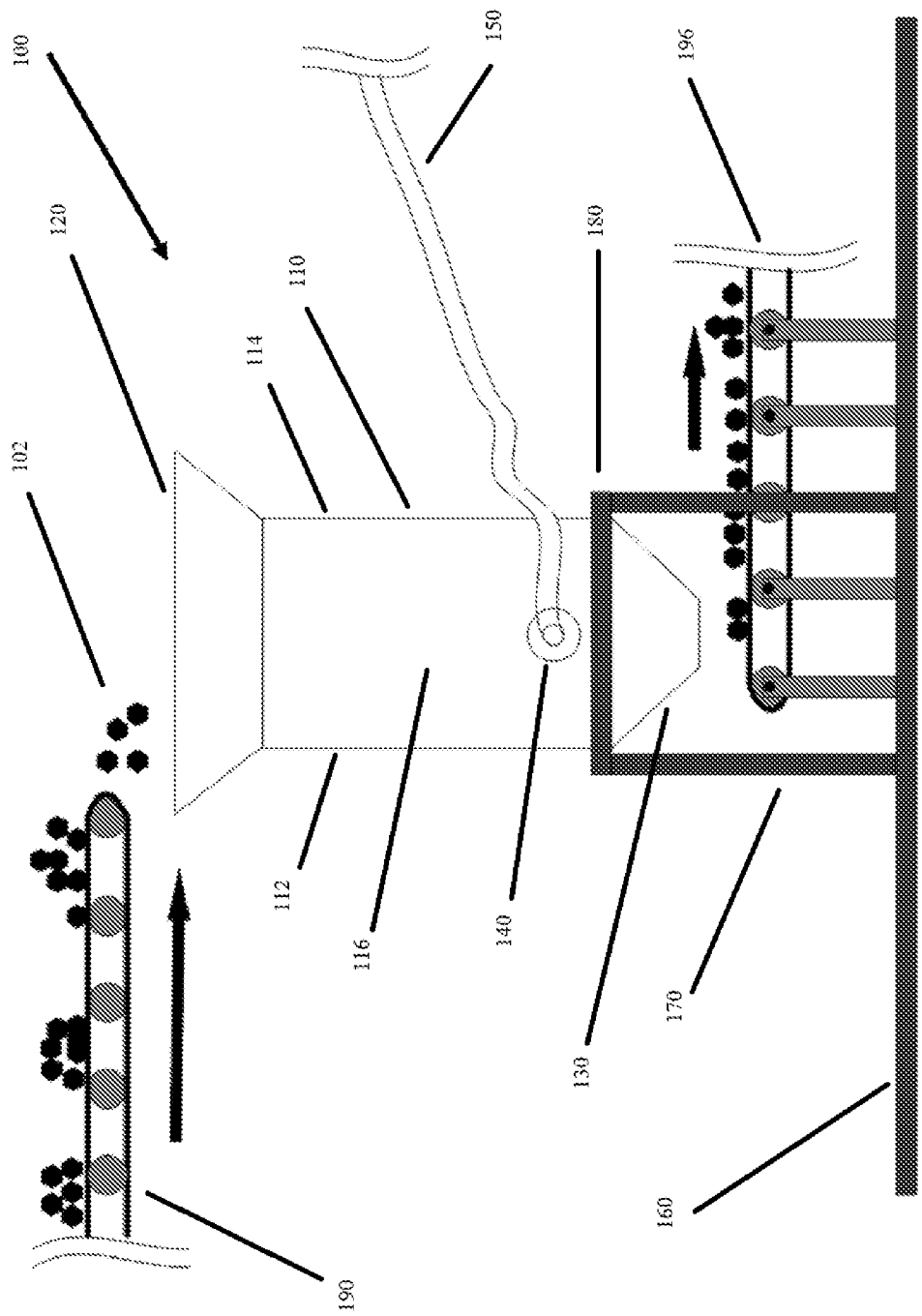
FIG. 1 is an environmental view of a heat recovery system having a heat recovery apparatus 100 in accordance with one or more aspects of the present disclosure.
Figure 5:
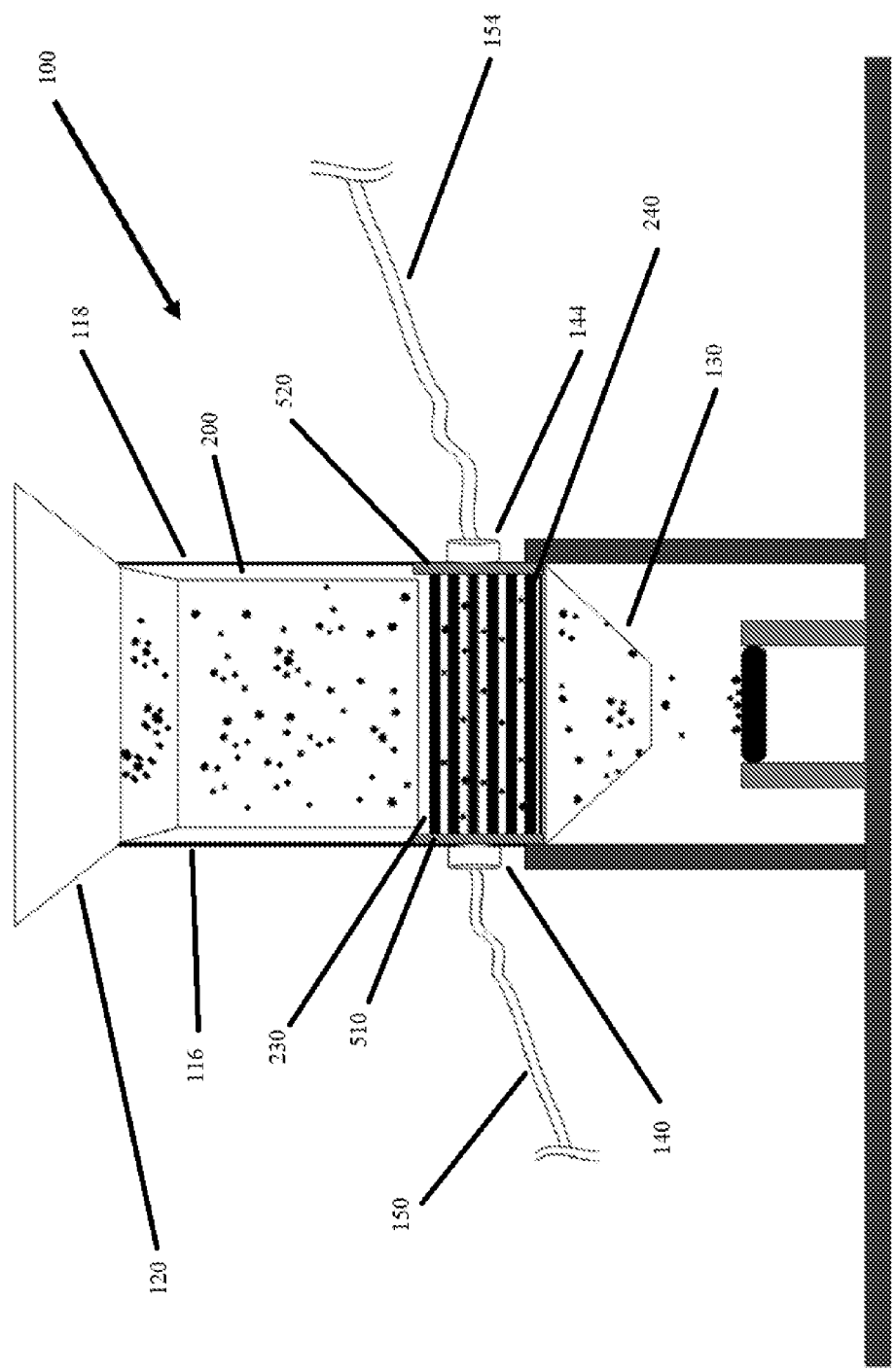
FIG. 5 is a front side cross-sectional view of the heat recovery apparatus in accordance with one or more aspects of the present disclosure.

FIG. 1 is an environmental view of a heat recovery system having a heat recovery apparatus 100 in accordance with one or more aspects of the present disclosure. The heat recovery apparatus 100 includes a heat transfer body 110, a particulate inlet 120, and a particulate outlet 130. The heat transfer body 110 includes a front side 112, a back side 114, a right side 116 and a left side 118 (FIG. 5). At least one fluid inlet 140 is located on the right side and at least one fluid outlet 144 (FIG. 5) is located on the left side 118. In some instances, the heat recovery apparatus 100 has one to ten fluid inlets 140 and one to ten fluid outlets 144. In some instances, the heat recovery apparatus 100 has the same number of fluid inlets 140 and fluid outlets 144. In some instances, the heat recovery apparatus 100 has a different number of fluid inlets 140 and fluid outlets 144. Each fluid inlet 140 is fluidically coupled with a heat transfer fluid source (not shown) via a hose 150. Each fluid outlet 144 is fluidically coupled with heated heat transfer fluid reservoir (not shown) via a hose 154 (FIG. 5). Each fluid inlet 140 and each fluid outlet 144 has a corresponding manifold. The heat recovery apparatus 100 is coupled with a suitable base support 160 via weight bearing and beams 170 and 180, respectively. The base support 160 can be, for example, the ground, a concrete slab or foundation, or a raised platform structure. The heat recovery system further includes an input conveyor 190 for introducing hot particulate 102 into the heat recovery apparatus 100. The heat recovery system further includes an outlet conveyor 196 for transmitting particulate, which has traversed the heat recovery apparatus 100, away from the heat recovery apparatus 100. The heat recovery system can be used to recover energy, in the form of heat, from any hot particulate material such as for example solar-heated sand or ceramic particles, or granulated slag. In general, molten slag can begin to solidify at temperatures ranging from about 700° C. to about 1100° C., depending on the composition of the slag. Before entering the particulate inlet 120, the solidified slag can be granulated to facilitate transmission of the slag through the heat recovery apparatus 100 as described below. Alternatively, particles of sand or ceramic compositions can be heated by, for example, regular or concentrated solar energy to about 600° C. to about 1000° C. and subsequently introduced into the heat recovery apparatus 100 as described below.

The input conveyor 190 transmits hot particulate 102 to the particulate inlet 120 of the heat recovery apparatus 100. In FIG. 1, the input conveyor 190 is substantially parallel to the base support 160. In some instances, the input conveyor 190 can have a grading apparatus or shaker coupled therewith which can convert irregularly shaped bulk hot particulate 102 into a uniform layer of hot particulate 102 on the input conveyor 190. Formation of a uniform layer of hot particulate 102 prior to transmission to the particulate inlet 120 of the heat recovery apparatus 100 can standardize the amount of hot particulate 102 delivered to the particulate inlet 120 of the heat recovery apparatus 100 over a predefined period of time and reduce the incidence of particulates which are too large in size from passing through the heat recovery apparatus 100. In some instances, a mesh grate or other suitable sifting structure can be placed on the particulate inlet 120 for the same purpose.

In some instances, the input conveyor 190 is not substantially parallel with the base support 160. In some instances, the input conveyor 190 can increase or decrease in elevation as it nears the heat recovery apparatus 100. In some instances, the input conveyor 190 can be a bucket-elevator or a skip hoist. In other instances, the input conveyor 190 can be an insulated particulate holding tank with a release valve, being variably actuatable between fully or partially open and closed positions, located directly above the particulate inlet 120 of the heat recovery apparatus 100.

The heat transfer fluid source can be, for example, a vessel, receptacle, tank, or any other suitable storage means. The heated heat transfer fluid reservoir can also be, for example, a vessel, receptacle, tank, or any other suitable storage means. The heated heat transfer fluid reservoir can be coupled with an external energy conversion system, such as for example, a steam engine or turbine, a piston, a thermoelectric device, a base load electricity generation system, a water heater, an energy recovery ventilator, a heat recover ventilator, or a rotary heat exchanger, for converting the energy absorbed by the heat transfer fluid to another form of usable energy. In some instances, a pump can be incorporated between the heat transfer fluid source and the at least one fluid inlet 150 to apply a positive pressure to the heat transfer fluid and "push" the heat transfer fluid through the plurality of pipes 240. In some instances a vacuum pump can be incorporated between the outlet pump and the heated heat transfer fluid reservoir to apply a partial vacuum, or negative pressure relative to atmospheric pressure, to the heat transfer fluid and "pull" the heat transfer fluid through the plurality of pipes 240. In some instances, both a pump and vacuum pump, can be used. In some instances, the heat transfer fluid source can itself be pressurized such as, for example by compressed air or supercritical carbon dioxide ($CO_2$).

In some instances, the heat transfer fluid source and the heated heat transfer fluid reservoir can be fluidically coupled to form a closed-loop system. When the heat transfer fluid source and the heated heat transfer fluid reservoir are fluidically coupled to form a closed-loop system, the heat transfer fluid can be recycled and reused continuously by the heat recovery apparatus 100. In some instances, when a closed-loop system is used, a pump can be incorporated between the heat transfer fluid source and the at least one fluid inlet 150 to apply a positive pressure to the heat transfer fluid and "push" the heat transfer fluid through the plurality of pipes 240. In some instances, when a closed-loop system is used, a vacuum pump can be incorporated between the outlet pump and the heated heat transfer fluid reservoir to apply a partial vacuum, or negative pressure relative to atmospheric pressure, to the heat transfer fluid, and "pull" the heat transfer fluid through the plurality of pipes 240. In some instances, when a closed-loop system is used, both a pump and vacuum pump can be used.

In FIG. 1, the heat recovery apparatus 100 is directly coupled with one or more of the weight bearing beams 170 and 180. In some instances, the heat recovery apparatus 100 is indirectly coupled with one or more of the weight bearing beams 170 and 180 via a plurality of elastically resilient members, such as springs, rubber bumpers or any other suitable elastically resilient members known to one of skill in the art. When the heat recovery apparatus 100 includes a plurality of elastically resilient members, the heat recovery apparatus 100 can be coupled with a mechanical shaker or agitator which can regularly or irregularly act upon the heat recovery apparatus 100 to help facilitate movement of the hot particulate 102 through the heat recovery apparatus 100.

Each fluid inlet 140 and inlet manifold 510 (FIG. 5), and each corresponding fluid outlet 144 and outlet manifold 520 (FIG. 5), can be associated with a predefined number of pipes of the plurality of pipes 1700. For example, if the heat recovery apparatus 100 has three fluid inlets 140 (and three corresponding inlet manifolds 510) and three fluid outlets 144 (and three corresponding outlet manifolds 510) the plurality of pipes 240 (FIG. 2) can be segmented into three groupings of pipes with each grouping corresponding to a defined fluid inlet 140 (and corresponding inlet manifold 510) and a defined fluid outlet 144 (and a corresponding outlet manifold 520). Additionally, for example, if the heat recovery apparatus 100 has one fluid inlet 140 (and one corresponding inlet manifold 510) and three fluid outlets 144 (and three corresponding outlet manifolds 510) the plurality of pipes 240 can be segmented into three groupings of pipes, each grouping corresponding to the single fluid inlet 140 (and corresponding inlet manifold 510) and one of the three fluid outlets 144 (and the three corresponding outlet manifolds 520).

Figure 2:
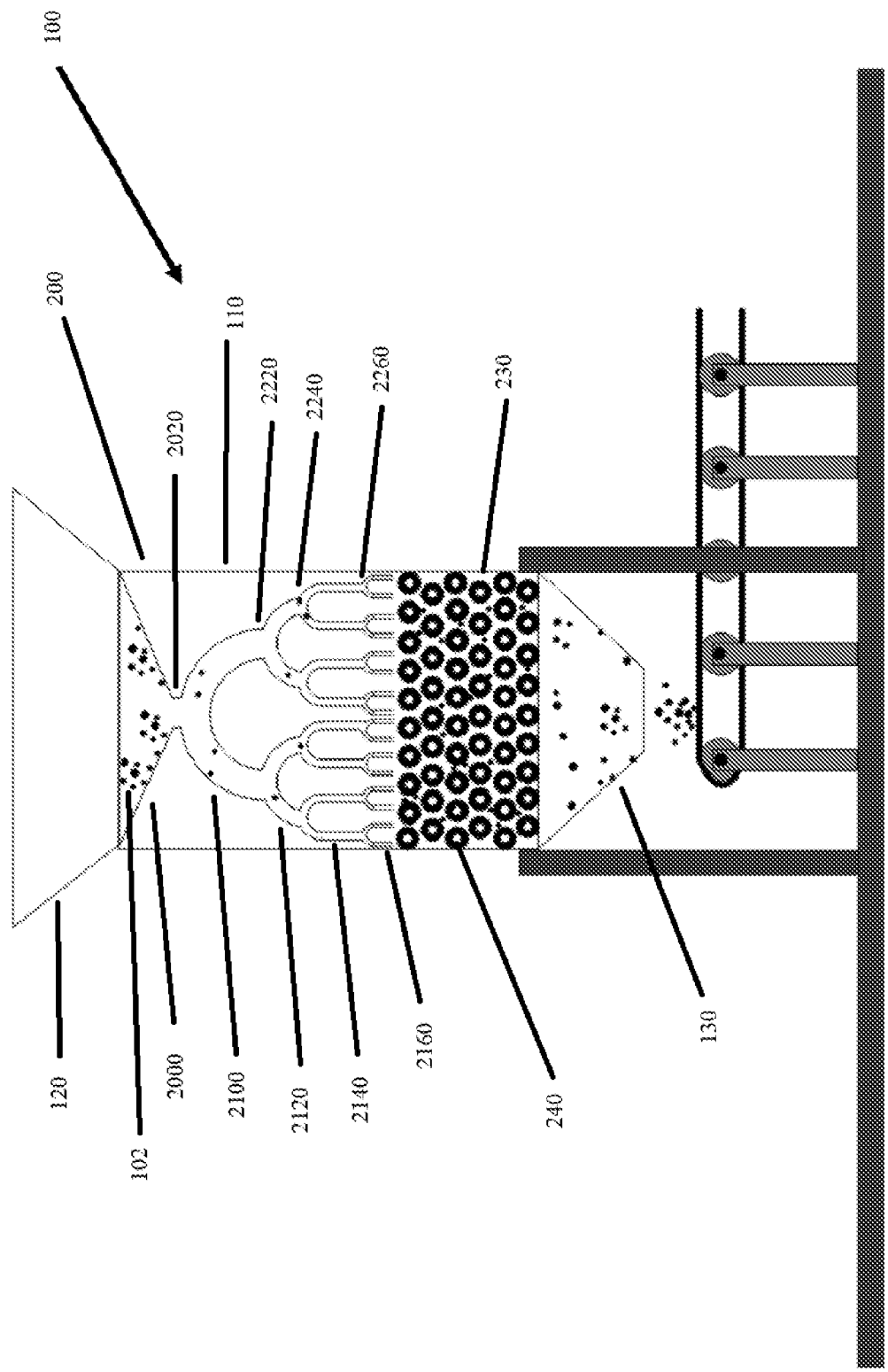
FIG. 2 is a right side cross-sectional view of the heat recovery apparatus in accordance with one or more aspects of the present disclosure.

FIG. 2 is a right side cross-sectional view of the heat recovery apparatus in accordance with one or more aspects of the present disclosure. In FIG. 2, the heat transfer body 110 includes a particulate distributor 200 and a cavity 230 having a plurality of pipes 240 therein for the flow of a heat transfer fluid therethrough. The particulate distributor 200 includes a first section 2000, which receives hot particulate from the particulate inlet 120, a second section 2100, fluidically coupled with the first section 2000 via a first branch point 2020, which divides the hot particulate 102 into two different directions of flow. The second section 2100 is fluidically coupled with two third sections 2120 via second branch points 2220. In some instances, each third section 2120 can have substantially the same dimensions such as, for example, the cross-sectional diameter. In other instances, one of the third sections 2120 can have a cross-sectional diameter, or other dimension, which is larger or smaller than the other third section 2120 which is fluidically coupled to the same second branch point 2220. Each third section 2120 is fluidically coupled with two fourth sections 2140 via a third branch point 2240. In some instances, each fourth section 2140 can have substantially the same dimensions such as, for example, the cross-sectional diameter. In other instances, one of the fourth sections 2140 can have a cross-sectional diameter, or other dimension, which is larger or smaller than the other fourth section 2140 which is fluidically coupled to the same third branch point 2240. Each fourth section 2140 is fluidically coupled with two fifth sections 2160 via a fourth branch point 2260. Each fifth section 2160 is in fluid communication with the cavity 230. In some instances, each fifth section 2160 can have substantially the same dimensions such as, for example, the cross-sectional diameter. In other instances, one of the fifth sections 2160 can have a cross-sectional diameter, or other dimension, which is larger or smaller than the other fifth section 2160 which is fluidically coupled to the same fourth branch point 2260.

In use, hot particulate 102 is introduced into the heat recovery apparatus 100 via particulate inlet 120. The hot particulate 102 is then progressively dispersed as it travels through the particulate distributor 200. The hot particulate 102 then exits the particulate distributor 200 through the fifth sections 2160 and enters the cavity 230 containing a plurality of pipes 240. Each of the plurality of pipes 240 has a longitudinal passageway for the transmission of a heat transfer fluid therethrough. As the distributed hot particulate 102 passes through the cavity 230 and around each of the plurality of pipes 240, energy in the form of heat is transferred from the hot particulate 102 to the heat transfer fluid via thermal radiation, convection or conduction. After the particulate 102, now cooled, has passed through the cavity 230 and around each of the plurality of pipes 240, it is dispensed onto the outlet conveyor 196 via the particulate outlet 130.

In FIG. 2, the particulate distributor 200 is shown as having first through fifth sections 2000, 2100, 2120, 2140 and 2160, respectively. In some instances, one of more of the third through fifth sections 2120, 2140 and 2160 can be omitted from the particulate distributor 200. In other instances, the particulate distributor 200 can be modified to have more than five section such as six to twenty sections, alternatively six to fifteen sections, and alternatively six to ten sections.

In some instances, the cavity 230 can be lined or coated with an insulating material and/or a reflective material to direct the transfer of heat from the particulate 102 toward the plurality of pipes 240 and inhibit the transfer of heat to other components of the heat recovery apparatus 100. Each of the plurality of pipes 240 can be made from any suitable material known to one of ordinary skill in the art. The primary limitation to the material from which each of the plurality of pipes 240 is made is that such material should have a melting point sufficiently above the temperature of the hot particulate 102. In general, each of the plurality of pipes 240 can be made from a metal such as iron or copper, or an alloy such as cast iron, steel (stainless, low-carbon, medium-carbon, or high-carbon), Inconel®, Incoloy®, or Hastelloy®.

The heat transfer fluid can be any suitable heat transfer fluid known to one of ordinary skill in the art. In some instances, the heat transfer fluid can be a liquid or aqueous solution such as, for example, water, salt water, a eutectic mixture of biphenyl ($C_{12}H_{10}$) and diphenyl oxide ($C_{12}H_{10}O$), compositions comprising terphenyls and/or quaterphenyls or derivatives thereof, a silicone-based fluid, a propylene glycol- or ethylene glycol-based fluid, an oil containing one or more aliphatic and/or aromatic hydrocarbons, a molten salt mixture comprising one or more nitrates (potassium, sodium, calcium and lithium), any combination thereof, or any other suitable liquid or aqueous heat transfer fluids. In other instances, the heat transfer fluid can be a compressed or ambient pressure gas such as, for example, air, hydrogen, helium, steam, carbon dioxide, argon, natural gas, any suitable combination thereof, or any other suitable gas-phase heat transfer fluid. In yet other instances, the heat transfer fluid can be a combination of one or more gases and one or more liquids or aqueous solutions. In yet other instances, the heat transfer fluid can be a liquid or aqueous solution that converts to a gas when heated in the plurality of pipes 240.

Figure 3:
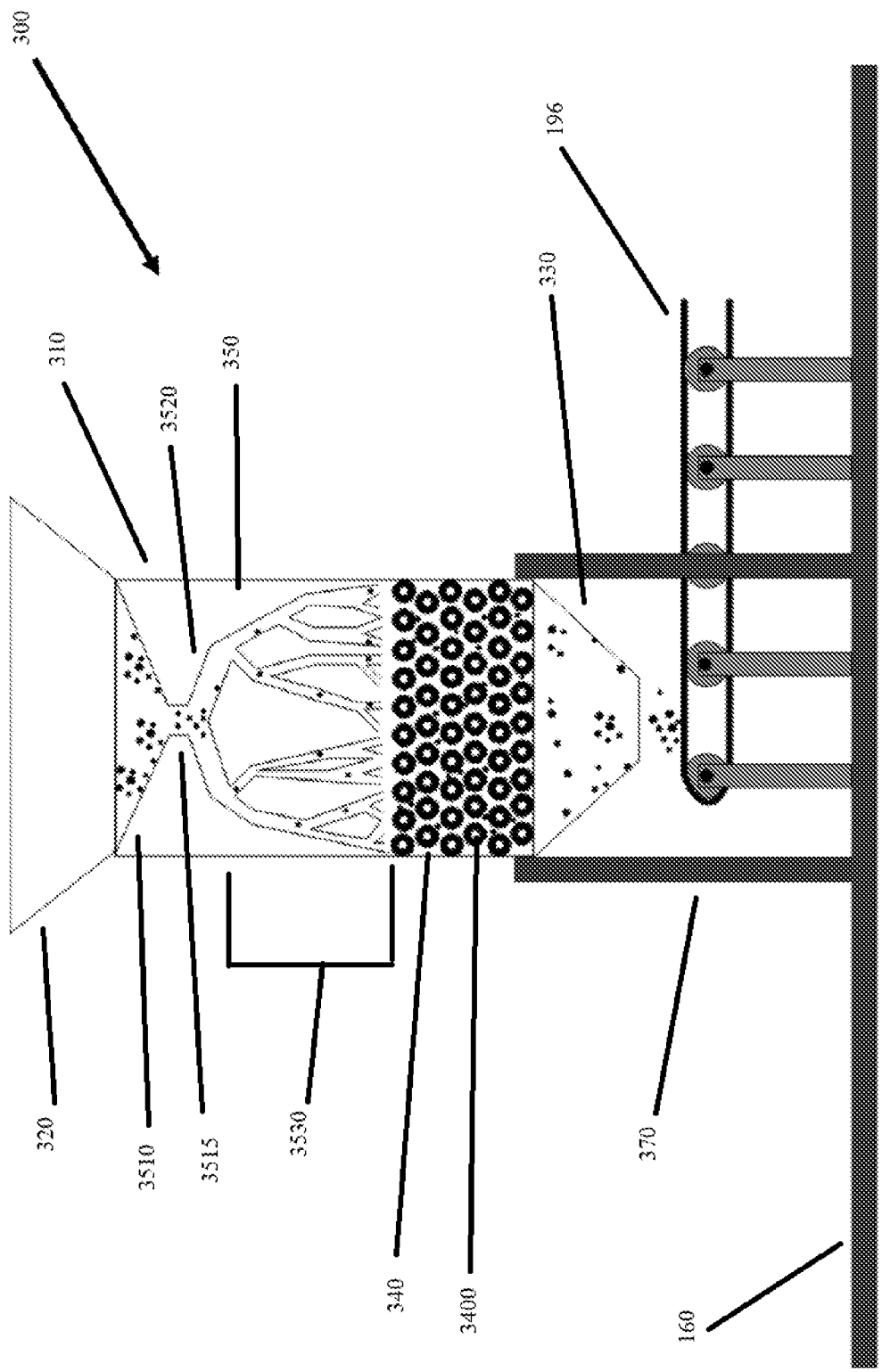
FIG. 3 is a right side cross-sectional view of another heat recovery apparatus in accordance with one or more aspects of the present disclosure.

FIG. 3 is a right side cross-sectional view of another heat recovery apparatus 300 in accordance with one or more aspects of the present disclosure. The heat recovery apparatus 300 includes elements substantially similar to that of the heat recovery apparatus 100 with some variation. The heat recovery apparatus 300 includes a heat transfer body 310, a particulate inlet 320, and a particulate outlet 330. The heat recovery apparatus 300 is coupled with the base support 160 via weight bearing vertical beams 370 and horizontal beams (not shown). The heat recovery apparatus 300 can be used to recover energy, in the form of heat, from any heated particulate material such as, for example, solar-heated sand or ceramic particles or granulated slag. In general, molten slag can begin to solidify at temperatures ranging from about 700° C. to about 1100° C., depending on the composition of the slag. Before entering the particulate inlet 320, the solidified slag can be granulated to facilitate transmission of the slag through the heat recovery apparatus 300 as described below. Alternatively, particles of sand or ceramic compositions can be heated by, for example regular or concentrated solar energy to about 600° C. to about 1000° C. and subsequently introduced into the heat recovery apparatus 300 as described below.

The heat transfer body 310 includes a particulate distributor 350 and a cavity 340 containing a plurality of pipes 3400 therein for the flow of heat transfer fluid therethrough. The particulate distributor 350 includes an first section 3510, which receives hot particulate 102 from the particulate inlet 320, a second section 3520, fluidically coupled with the first section 3510 via a branch point 3515, which divides the hot particulate 102 into two different directions of flow. The second section 3520 is fluidically coupled to a third section 3530 which has a plurality of variable diameter and directionally oriented passageways which are in fluid communication with the cavity 340.

In use, hot particulate 102 is introduced into the heat recovery apparatus 300 via the particulate inlet 320. The hot particulate 102 is then progressively dispersed as it travels through the particulate distributor 350. The hot particulate 102 then exits the particulate distributor 350 through the passageways of the third section 3530 and enters the cavity 340 containing the plurality of pipes 3400. Each of the plurality of pipes 3400 has a longitudinal passageway for the transmission of a heat transfer fluid therethrough. As the distributed hot particulate 102 passes through the cavity 340 and around each of the plurality of pipes 3400, energy in the form of heat is transferred from the hot particulate 102 to the heat transfer fluid via one or more of thermal radiation, convection or conduction. After the particulate 102, now cooled, has passed through the cavity 340 and around each of the plurality of pipes 3400, it is dispensed onto the outlet conveyor 196 via the particulate outlet 330.

In some instances, the cavity 340 can be lined or coated with an insulating material and/or a reflective material to direct the transfer of heat from the particulate 102 toward the plurality of pipes 3400 and inhibit the transfer of heat to other components of the heat recovery apparatus 300. Each of the plurality of pipes 3400 can be made from any suitable material known to one of ordinary skill in the art. The primary limitation to the material from which each of the plurality of pipes 3400 is made is that such material should have a melting point sufficiently above the temperature of the hot particulate 102. In general, each of the plurality of pipes 3400 can be made from a metal such as iron or copper, or an alloy such as cast iron, steel (stainless, low-carbon, medium-carbon, or high-carbon), Inconel®, Incoloy®, Haynes®, or Hastelloy®.

Figure 4:
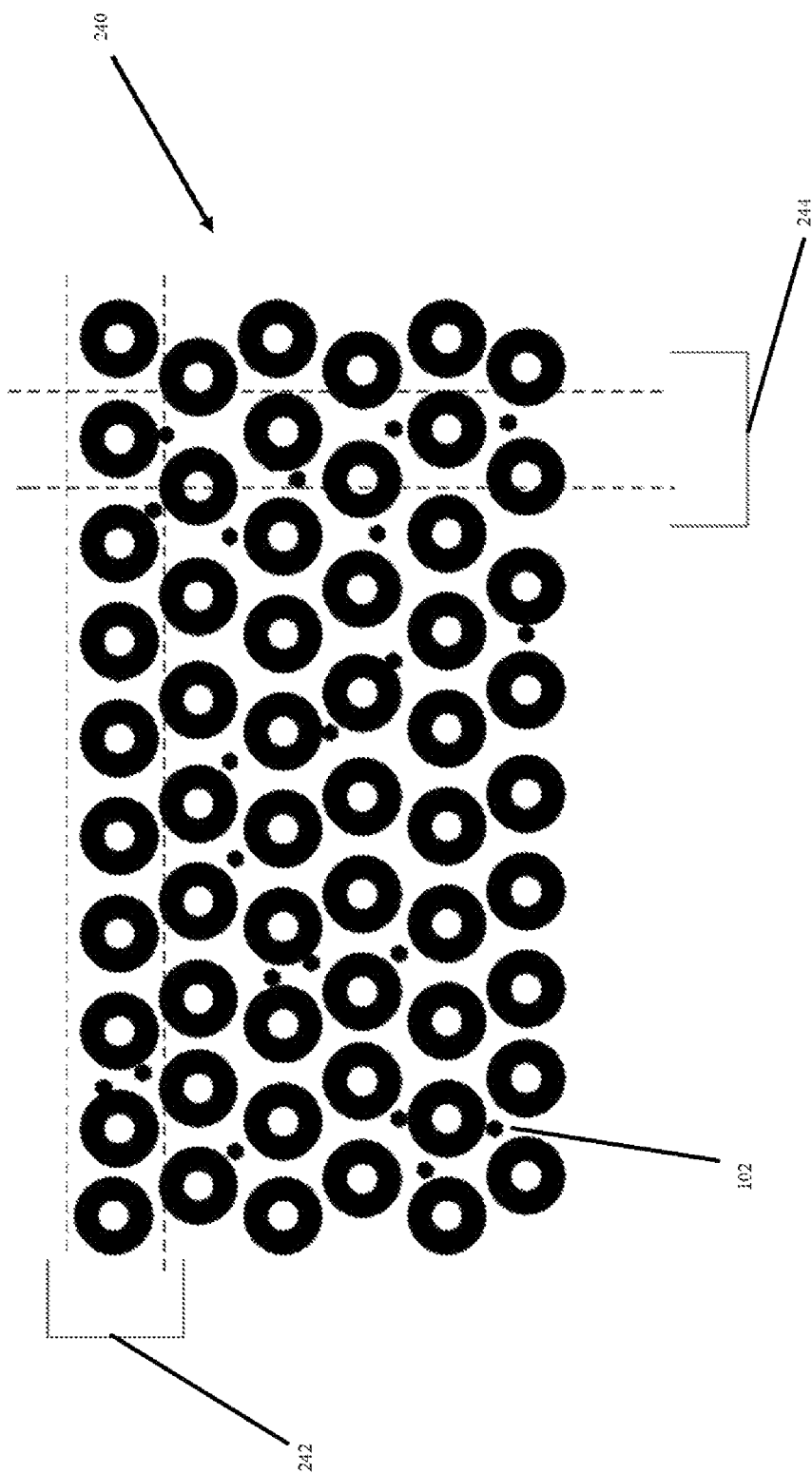
FIG. 4 is a right side cross-sectional view of a series of heat-transfer fluid containing pipes of a heat recovery apparatus in accordance with one or more aspects of the present disclosure.

FIG. 4 is a right side cross-sectional view of a series of heat-transfer fluid containing pipes 240 of the heat recovery apparatus 100 in accordance with one or more aspects of the present disclosure. As shown, the plurality of pipes 240 can be organized into a plurality of rows 242 and a plurality of columns 244. When the plurality of pipes 240 are organized into a plurality of rows 242 and a plurality of columns 244, each pipe can be associated with a row 242 and a column 244. Each pipe should be spaced apart from adjacent pipes such that the hot particulate 102 can pass therebetween. In some instances, each pipe is spaced equally apart from every adjacent pipe. In some instances, the distances between adjacent rows 242 can vary. In some instances, the distances between adjacent columns 244 can vary. In other instances, the distance between adjacent rows 242 can be greater than or less than the distance between adjacent columns 244. The above description of FIG. 4 can equally be applied to the heat recovery apparatus 300 and the plurality of pipes 3400.

FIG. 5 is a front side cross-sectional view of the heat recovery apparatus 100 in accordance with one or more aspects of the present disclosure. While FIG. 5 is discussed with reference to the heat recovery apparatus 100, aspects of the following description can also be equally applied to the heat recovery apparatus 300 of FIG. 3 as will be apparent to one of ordinary skill in the art. As described above, the heat recovery apparatus 100 includes the heat transfer body 110, the particulate inlet 120, and the particulate outlet 130. The heat transfer body 110 includes a particulate distributor 200 and the cavity 230 containing a plurality of pipes 240 for the flow of heat transfer fluid therethrough. The plurality of pipes 240 can be segmented into rows and columns, substantially as described in FIG. 4. In the heat recovery apparatus 100, each of the plurality of pipes 240 are parallel or substantially parallel with the base support 160. The plurality of pipes 240 are fluidically coupled with the at least one fluid inlet 140 via at least one inlet manifold 510. The plurality of pipes 240 are also fluidically coupled with the at least one fluid outlet 144 via at least one outlet manifold 520. Each inlet manifold 510 dispenses heat transfer fluid, from a corresponding fluid inlet 140, into each of the plurality of pipes 240 and each outlet manifold 520 combines the heated heat transfer fluid into a single fluid stream which is subsequently transmitted to the heated heat transfer fluid reservoir via a corresponding fluid outlet 144 and hose 154.

Figure 6:
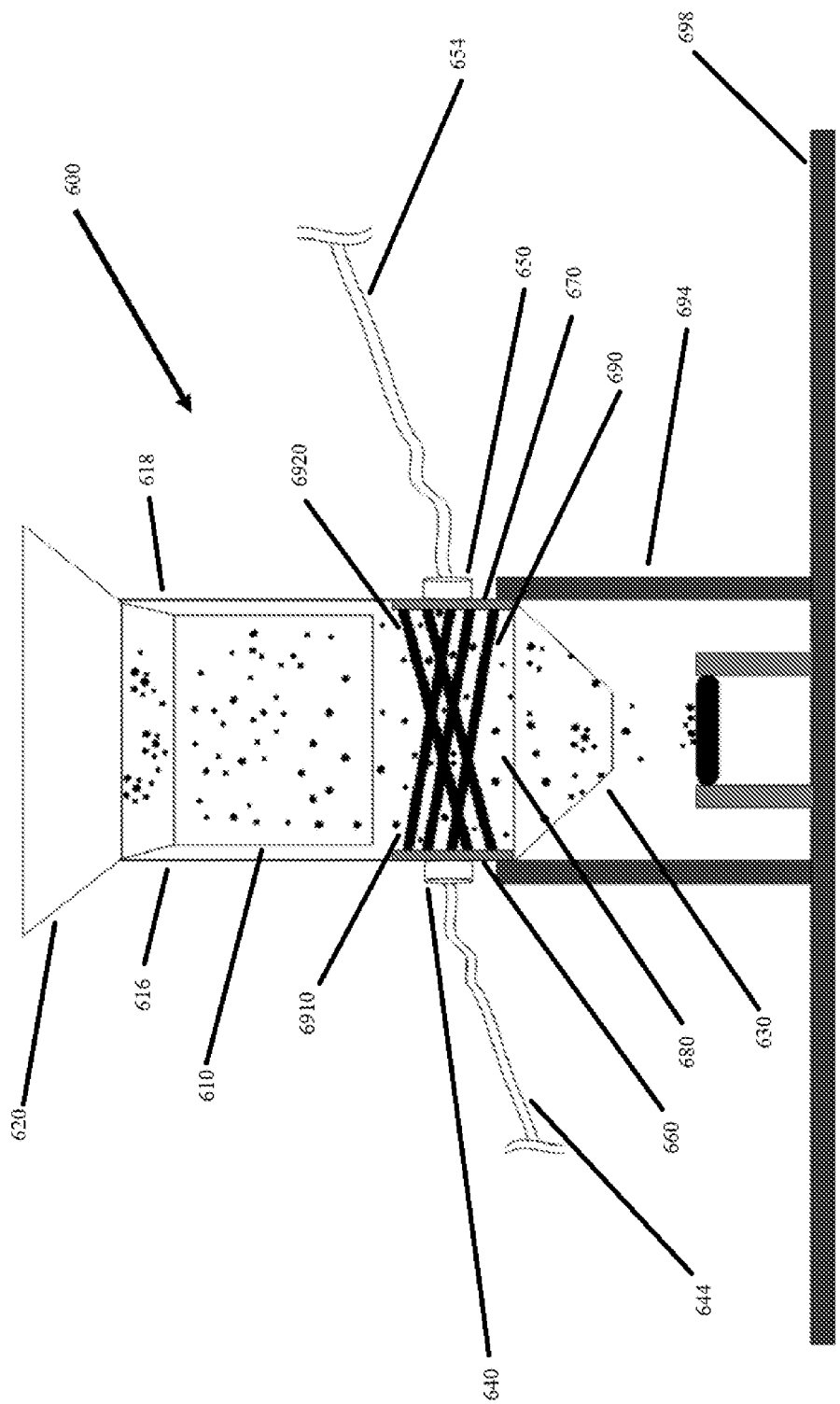
FIG. 6 is a front side cross-sectional view of another heat recovery apparatus in accordance with one or more aspects of the present disclosure.

FIG. 6 is a front side cross-sectional view of another heat recovery apparatus 600 in accordance with one or more aspects of the present disclosure. The heat recovery apparatus 600 includes a heat transfer body 610, a particulate inlet 620, and a particulate outlet 630. The heat transfer body 610 includes a right side 616 and a left side 618. At least one fluid inlet 640 is located on the right side 616 and at least one fluid outlet 650 is located on the left side 618. In some instances, the heat recovery apparatus 600 has one to ten fluid inlets 640 and one to ten fluid outlets 650. In some instances, the heat recovery apparatus 600 has the same number of fluid inlets 640 and fluid outlets 650. In some instances, the heat recovery apparatus 600 has a different number of fluid inlets 640 and fluid outlets 650. Each fluid inlet 640 is fluidically coupled with a heat transfer fluid source (not shown) via a hose 644. Each fluid outlet 650 is fluidically coupled with heated heat transfer fluid reservoir (not shown) via a hose 654. The heat recovery apparatus 600 is coupled with a suitable base support 698 via weight bearing vertical beams 694 and horizontal beams (not shown). The base support 698 can be, for example, the ground, a concrete slab or foundation, or a raised platform structure.

The heat transfer body 610 includes a particulate distributor (which can be the particulate distributor 200, the particulate distributor 300, or any other suitable particulate distributor configuration) and a cavity 680 containing a plurality of pipes 690 for the flow of heat transfer fluid therethrough. The plurality of pipes 690 are fluidically coupled with the at least one fluid inlet 640 via at least one inlet manifold 660. The plurality of pipes 690 are also fluidically coupled with the at least one fluid outlet 650 via at least one outlet manifold 670. The at least one inlet manifold 660 dispenses heat transfer fluid, from a corresponding fluid inlet 640, to each of the plurality of pipes 690 and the at least one outlet manifold 670 combines the heated heat transfer fluid into a single fluid stream which is subsequently transmitted to the heated heat transfer fluid reservoir via a corresponding fluid outlet 650 and the hose 654.

In some instances, the cavity 680 can be lined or coated with an insulating material and/or a reflective material to direct the transfer of heat from the particulate 102 toward the plurality of pipes 690 and inhibit the transfer of heat to other components of the heat recovery apparatus 600. Each of the plurality of pipes 690 can be made from any suitable material known to one of ordinary skill in the art. Each of the plurality of pipes 690 can be made from any suitable material known to one of ordinary skill in the art. The primary limitation to the material from which each of the plurality of pipes 690 is made is that such material should have a melting point sufficiently above the temperature of the hot particulate. In general, each of the plurality of pipes 690 can be made from a metal such as iron or copper, an alloy such as cast iron, steel (stainless, low-carbon, medium-carbon, or high-carbon), Inconel®, Incoloy®, Haynes®, or Hastelloy®.

The plurality of pipes 690 can be segmented into rows and columns, substantially as described in FIG. 4. In the heat recovery apparatus 600, a first set of pipe columns 6910 extend from the right side 616 to the left side 618 in a downward direction, toward the base support 698, while a second set of columns 6920 extend from the right side 616 to the left side 618 in an upward direction, away from the base support 698. For example, if the plurality of pipes 690 comprises ten columns of pipes, the odd numbered columns can correspond to the first set of pipe columns 6910 and the even numbered columns can correspond to the second set of columns 6920, or vice versa. Alternatively, pipe columns 1, 2, 5, 6, 9 and 10 can correspond to the first set of pipe columns 6910 and the remainder can correspond to the second set of columns 6920, or vice versa. Alternatively, pipe columns 1-3 and 7-10 can correspond to the first set of pipe columns 6910 and the remainder can correspond to the second set of columns 6920, or vice versa. In some instances, each pipe of the plurality of pipes 690 can be angled 15 degrees relative to the base support 698. Alternatively, each pipe of the plurality of pipes 690 can be angled 5 degrees, alternatively 10 degrees, alternatively 20 degrees, alternatively 25 degrees, alternatively 30 degrees, alternatively 45 degrees, and alternatively 60 degrees relative to the base support 698. In some instances, each pipe of the set of columns 6910 and each pipe of the second set of columns 6920 can be described as having the same angle relative to the base support 698. In other instances each pipe of the set of columns 6910 can have an angle relative to the base support 698 which is different than the angle of each pipe of the second set of columns 6920 relative to the base support 698. In some instances, the average distance between an individual pipe and its adjacent pipes, in the plurality of pipes 690, at the inlet manifold 660 can be larger or smaller than the average distance between the individual pipe and its adjacent pipes at the outlet manifold 670.

The heat transfer fluid source can be, for example, a vessel, receptacle, tank, or any other suitable storage means. The heated heat transfer fluid reservoir can also be for example a vessel, receptacle, tank, or any other suitable storage means. The heated heat transfer fluid reservoir can be coupled with an external energy conversion system, such as for example, a steam engine or turbine, for converting the energy absorbed by the heat transfer fluid to another form of usable energy. In some instances, a pump can be incorporated between the heat transfer fluid source and the at least one fluid inlet 640 to apply a positive pressure to the heat transfer fluid and "push" the heat transfer fluid through the plurality of pipes 690. In some instances a vacuum pump can be incorporated between the outlet pump and the heated heat transfer fluid reservoir to apply a partial vacuum, or negative pressure relative to atmospheric pressure, to the heat transfer fluid and "pull" the heat transfer fluid through the plurality of pipes 640. In some instances, both a pump and vacuum pump, can be used. In some instances, the heat transfer fluid source can itself be pressurized such as, for example compressed air.

In some instances, the heat transfer fluid source and the heated heat transfer fluid reservoir can be fluidically coupled to form a closed-loop system. When the heat transfer fluid source and the heated heat transfer fluid reservoir are fluidically coupled to form a closed-loop system, the heat transfer fluid can be recycled and reused continuously by the heat recovery apparatus 600. In some instances, when a closed-loop system is used, a pump can be incorporated between the heat transfer fluid source and the at least one fluid inlet 640 to apply a positive pressure to the heat transfer fluid, and "push" the heat transfer fluid through the plurality of pipes 690. In some instances, when a closed-loop system is used, a vacuum pump can be incorporated between the outlet pump and the heated heat transfer fluid reservoir to apply a partial vacuum, or negative pressure relative to atmospheric pressure, to the heat transfer fluid and "pull" the heat transfer fluid through the plurality of pipes 690. In some instances, when a closed-loop system is used, both a pump and vacuum pump can be used.

In FIG. 6, the heat recovery apparatus 600 is directly coupled with one or more of the weight bearing vertical beams 670 and horizontal beams (not shown). In some instances, the heat recovery apparatus 600 is indirectly coupled with one or more of the weight bearing vertical beams 670 and horizontal beams via a plurality of elastically resilient members, such as springs, rubber bumpers or any other suitable elastically resilient member known to one of ordinary skill in the art. When the heat recovery apparatus 600 includes a plurality of elastically resilient members, the heat recovery apparatus 600 can be coupled with a mechanical shaker or agitator which can regularly or irregularly act upon the heat recovery apparatus 600 to help facilitate movement of the particulate through the heat recovery apparatus 600.

Figure 7:
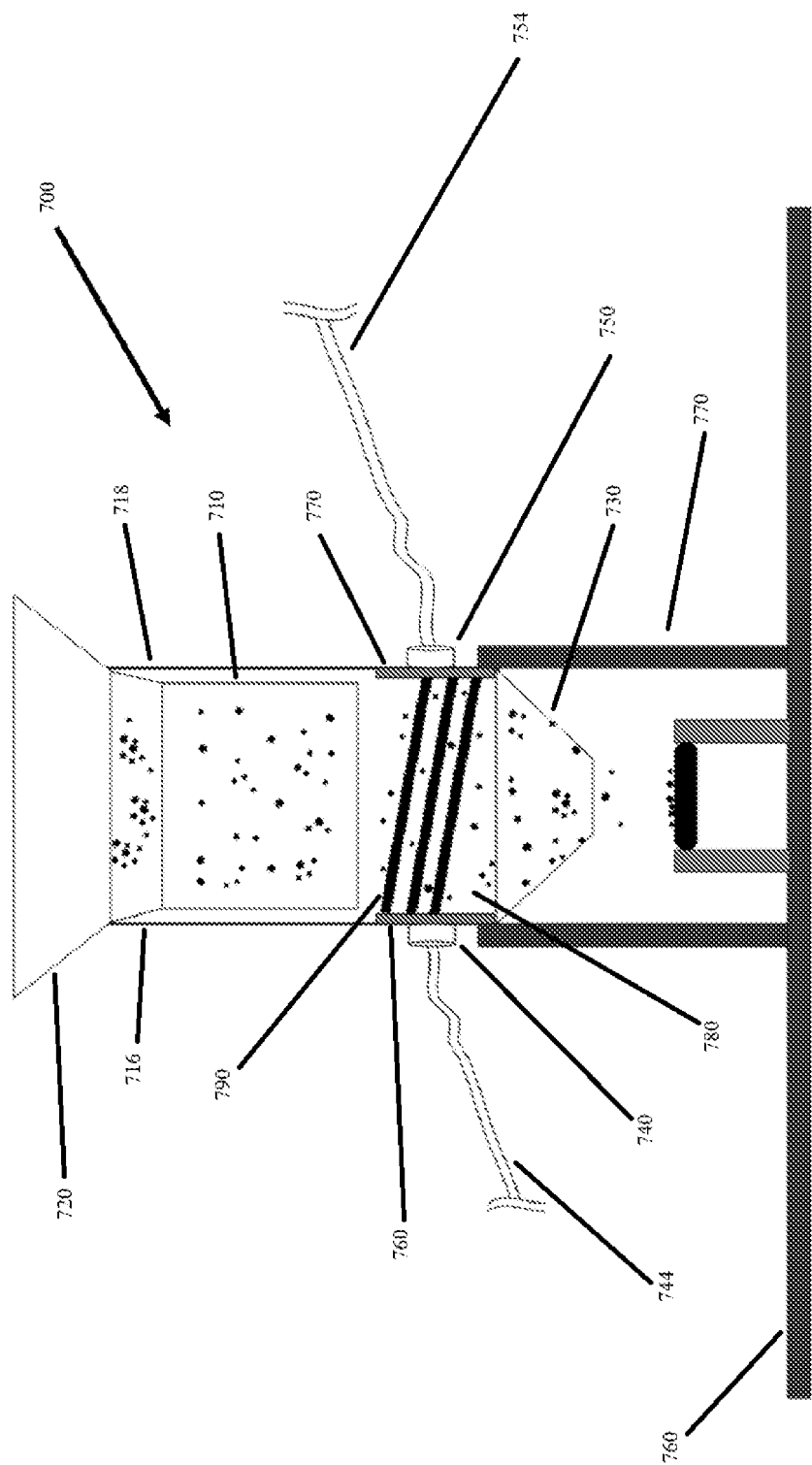
FIG. 7 is a front side cross-sectional view of yet another heat recovery apparatus in accordance with one or more aspects of the present disclosure.

FIG. 7 is a front side cross-sectional view of yet another heat recovery apparatus 700 in accordance with one or more aspects of the present disclosure. The heat recovery apparatus 700 includes a heat transfer body 710, a particulate inlet 720, and a particulate outlet 730. The heat transfer body includes a right side 716 and a left side 718. At least one fluid inlet 740 is located on the right side 716 and at least one fluid outlet 750 is located on the left side 718. In some instances, the heat recovery apparatus 700 has one to ten fluid inlets 740 and one to ten fluid outlets 750. In some instances, the heat recovery apparatus 700 has the same number of fluid inlets 740 and fluid outlets 750. In some instances, the heat recovery apparatus 700 has a different number of fluid inlets 740 and fluid outlets 750. Each fluid inlet 740 and each fluid outlet 750 will have a corresponding manifold. Each fluid inlet 740 is fluidically coupled with a heat transfer fluid source (not shown) via a hose 744. Each fluid outlet 750 is fluidically coupled with heated heat transfer fluid reservoir (not shown) via a hose 754. The heat recovery apparatus 700 is coupled with a suitable base support 760 via weight bearing vertical beams 770 and horizontal beams (not shown). The base support 760 can be, for example, the ground, a concrete slab or foundation, or a raised platform structure.

The heat transfer body 710 includes a particulate distributor (which can be the particulate distributor 200, the particulate distributor 300, or any other suitable particulate distributor configuration) and a cavity 780 containing a plurality of pipes 790 for the flow of heat transfer fluid therethrough. The plurality of pipes 790 are fluidically coupled with the at least one fluid inlet 740 via a corresponding inlet manifold 760. The plurality of pipes 790 are also fluidically coupled with the at least one fluid outlet 750 via a corresponding outlet manifold 770. The inlet manifold 760 dispenses heat transfer fluid, from the fluid inlet 740, to each of the plurality of pipes 790 and the outlet manifold 770 combines the heated heat transfer fluid into a single fluid stream which is subsequently transmitted to the heated heat transfer fluid reservoir via the fluid outlet 750 and the hose 754.

In the heat recovery apparatus 700, each of the plurality of pipes 790 extend from the right side 716 to the left side 718 in a downward direction, toward the base support 760. In some instances, each of the plurality of pipes 790 can instead extend from the right side 716 to the left side 718 in an upward direction, away from the base support 760. In some instances, each pipe of the plurality of pipes 790 can be angled 15 degrees relative to the base support 760. Alternatively, each pipe of the plurality of pipes 790 can be angled 5 degrees, alternatively 10 degrees, alternatively 20 degrees, alternatively 25 degrees, alternatively 30 degrees, alternatively 45 degrees, and alternatively 60 degrees relative to the base support 790.

In some instances, the cavity 780 can be lined or coated with an insulating material and/or a reflective material to direct the transfer of heat from the particulate 102 toward the plurality of pipes 790 and inhibit the transfer of heat to other components of the heat recovery apparatus 700. Each of the plurality of pipes 790 can be made from any suitable material known to one of ordinary skill in the art. The primary limitation to the material from which each of the plurality of pipes 790 is made is that such material should have a melting point sufficiently above the temperature of the hot particulate to avoid melting of the pipes. In general, each of the plurality of pipes 790 can be made from a metal such as iron or copper, an alloy such as cast iron, steel (stainless, low-carbon, medium-carbon, or high-carbon), Inconel®, Incoloy®, Haynes®, or Hastelloy®.

In the heat recovery apparatus 700, each of the plurality of pipes 790 are parallel or substantially parallel to each other and can have a general configuration as described in FIG. 4. In other instances, the average distance between an individual pipe and its adjacent pipes, in the plurality of pipes 790, at the inlet manifold 760 can be larger or smaller than the average distance between the individual pipe and its adjacent pipes at the outlet manifold 770.

The heat transfer fluid source can be, for example, a vessel, receptacle, tank, or any other suitable storage means. The heated heat transfer fluid reservoir can also be for example a vessel, receptacle, tank, or any other suitable storage means. The heated heat transfer fluid reservoir can be coupled with an external energy conversion system, such as for example, a steam engine or turbine, for converting the energy absorbed by the heat transfer fluid to another form of usable energy. In some instances, a pump can be incorporated between the heat transfer fluid source and the fluid inlet 740 to apply a positive pressure to the heat transfer fluid and "push" the heat transfer fluid through the plurality of pipes 790. In some instances a vacuum pump can be incorporated between the outlet pump and the heated heat transfer fluid reservoir to apply a partial vacuum, or negative pressure relative to atmospheric pressure, to the heat transfer fluid, and "pull" the heat transfer fluid through the plurality of pipes 790. In some instances, both a pump and vacuum pump, can be used. In some instances, the heat transfer fluid source can itself be pressurized such as, for example compressed air.

In some instances, the heat transfer fluid source and the heated heat transfer fluid reservoir can be fluidically coupled to form a closed-loop system. When the heat transfer fluid source and the heated heat transfer fluid reservoir are fluidically coupled to form a closed-loop system, the heat transfer fluid can be recycled and reused continuously by the heat recovery apparatus 700. In some instances, when a closed-loop system is used, a pump can be incorporated between the heat transfer fluid source and the fluid inlet 740 to apply a positive pressure to the heat transfer fluid and "push" the heat transfer fluid through the plurality of pipes 790. In some instances, when a closed-loop system is used, a vacuum pump can be incorporated between the outlet pump and the heated heat transfer fluid reservoir to apply a partial vacuum, or negative pressure relative to atmospheric pressure, to the heat transfer fluid and "pull" the heat transfer fluid through the plurality of pipes 790. In some instances, when a closed-loop system is used, both a pump and vacuum pump can be used.

In FIG. 7, the heat recovery apparatus 700 is directly coupled with one or more of the weight bearing vertical beams 770 and horizontal beams (not shown). In some instances, the heat recovery apparatus 700 is indirectly coupled with one or more of the weight bearing vertical beams 770 and horizontal beams via a plurality of elastically resilient members, such as springs or rubber bumpers. When the heat recovery apparatus 700 includes a plurality of elastically resilient members, the heat recovery apparatus 700 can be coupled with a mechanical shaker or agitator which can regularly or irregularly act upon the heat recovery apparatus 700 to help facilitate movement of the particulate through the heat recovery apparatus 700.

Statements of the Disclosure

Statements of the Disclosure include:

Statement 1: A heat recovery system comprising a hot particulate inlet conveyor; a heat recovery apparatus comprising a hot particulate inlet, a particulate distributor in fluid communication with the particulate inlet, a cavity in fluid communication with the particulate distributor, the cavity comprising a plurality of pipes configured for transmission of a heat transfer fluid therethrough, and a particulate outlet in fluid communication with the cavity; and a particulate outlet conveyor.

Statement 2: A heat recovery system according to Statement 1, wherein the heat recovery apparatus further comprises a heat transfer fluid inlet; an inlet manifold fluidically coupling the fluid inlet and the plurality of pipes; a heat transfer fluid outlet; and an outlet manifold fluidically coupling the fluid outlet and the plurality of pipes.

Statement 3: A heat recovery system according to Statement 2, further comprising a heat transfer fluid source fluidically coupled with the fluid inlet; and a heat transfer fluid reservoir fluidically coupled with the fluid outlet.

Statement 4: A heat recovery system according to Statement 3, wherein the heat transfer fluid reservoir is fluidically coupled with an external energy conversion system.

Statement 5: A heat recovery system according to Statement 4, wherein the heat transfer fluid source, the heat recovery apparatus, the heat transfer fluid reservoir, and the external energy conversion system form a closed-loop system.

Statement 6: A heat recovery system according to any one of Statements 1-5, wherein the heat transfer fluid comprises a gas.

Statement 7: A heat recovery system according to any one of Statements 1-6, wherein the heat transfer fluid comprises a liquid or an aqueous solution.

Statement 8: A heat recovery apparatus comprising a particulate inlet; a particulate distributor in fluid communication with the particulate inlet; a cavity in fluid communication with the particulate distributor, the cavity comprising a plurality of pipes configured for transmission of a heat transfer fluid therethrough; and a particulate outlet in fluid communication with the cavity.

Statement 9: A heat recovery apparatus according to Statement 8, wherein the heat recovery apparatus is configured to couple with a support base via weight bearing members.

Statement 10: A heat recovery apparatus according to Statement 9, wherein the heat recovery apparatus is configured to couple with the weight bearing members via a plurality of elastically resilient members.

Statement 11: A heat recovery apparatus according to any one of Statements 8-10, wherein the heat recovery apparatus is configured to couple with a mechanical shaker or agitator.

Statement 12: A heat recovery apparatus according to any one of Statements 8-11, further comprising a heat transfer fluid inlet; an inlet manifold fluidically coupling the fluid inlet and the plurality of pipes; a heat transfer fluid outlet; and an outlet manifold fluidically coupling the fluid outlet and the plurality of pipes.

Statement 13: A method for recovering heat from hot particulate, the method comprising delivering a hot particulate matter to a heat recovery apparatus, the heat recovery apparatus comprising a hot particulate inlet, a hot particulate distributor in fluid communication with the hot particulate inlet, a cavity in fluid communication with the hot particulate distributor, the cavity comprising a plurality of pipes configured for transmission of a heat transfer fluid therethrough, and a particulate outlet in fluid communication with the cavity; circulating a heat transfer fluid through the plurality of pipes; distributing, with the hot particulate distributor, the hot particulate over the plurality of pipes; transferring heat from the hot particulate to the circulating heat transfer fluid; and removing cooled particulate from the heat recovery apparatus through the particulate outlet.

Statement 14: A method according to Statement 13, wherein the hot particulate is granulated slag.

Statement 15: A method according to Statement 13, wherein the hot particulate is sand or a ceramic composition.

Statement 16: A method according to any one of Statements 13-15, further comprising shaking the heat recovery apparatus.

Statement 17: A method according to any one of Statements 13-16, wherein the heat recovery apparatus further comprises a heat transfer fluid inlet; an inlet manifold fluidically coupling the fluid inlet and the plurality of pipes; a heat transfer fluid outlet; and an outlet manifold fluidically coupling the fluid outlet and the plurality of pipes.

Statement 18: A method according to Statement 17, wherein the heat recovery apparatus further comprises a heat transfer fluid source fluidically coupled with the fluid inlet; and a heat transfer fluid reservoir fluidically coupled with the fluid outlet.

Statement 19: A method according to Statement 18, wherein the heat transfer fluid reservoir is fluidically coupled with an external energy conversion system.

Statement 20: A method according to Statement 19, further comprising transmitting the heat transfer fluid from the heat transfer fluid reservoir to the external energy conversion system.

Statement 21: A method according to Statement 19 or Statement 20, wherein the heat transfer fluid source, the heat recovery apparatus, the heat transfer fluid reservoir, and the external energy conversion system form a closed-loop system.

Statement 22: A method according to Statement 21, further comprising transmitting the heat transfer fluid from the external energy conversion system to the heat transfer fluid source.

Statement 23: A method according to any one of Statements 13-22, wherein the heat transfer fluid comprises a gas.

Statement 24: A method according to any one of Statements 13-23, wherein the heat transfer fluid comprises a liquid or an aqueous solution.

The embodiments shown and described above are only examples. Many details are often found in the art such as the other features of a heat recovery system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A heat recovery system comprising:
a hot particulate inlet conveyor;
a heat recovery apparatus comprising:
   a front side, a back side, a left side, a right side, a top, and a bottom;
   a hot particulate inlet located at the top of the heat recovery apparatus;
   a thermally insulated particulate distributor in fluid communication with the particulate inlet;
   a cavity in fluid communication with the particulate distributor, the cavity comprising a plurality of pipes extending from an inlet manifold located at the left side of the heat recovery apparatus to an outlet manifold located at the right side of the heat recovery apparatus, the plurality of pipes configured for transmission of a heat transfer fluid therethrough and direct transfer of heat from a hot particulate to the heat transfer fluid; and
   a particulate outlet located at the bottom of the heat recovery apparatus and in fluid communication with the cavity; and
a particulate outlet conveyor,
wherein the particulate distributor comprises:
   a first section configured to receive hot particulate from the hot particulate inlet;

a second section fluidically coupled with the first section via a first branch point and configured to deliver the hot particulate to the cavity, the second section configured to divide the hot particulate into a first plurality of flow directions toward the cavity; and a plurality of third sections fluidically coupled with the second section via second branch points, the plurality of third sections configured to further divide the hot particulate from the first plurality of flow directions into a second plurality of flow directions toward the cavity.

2. The heat recovery system of claim 1, wherein the heat recovery apparatus further comprises:
  a heat transfer fluid inlet, the heat transfer fluid inlet fluidically coupled with the plurality of pipes via the inlet manifold; and
  a heat transfer fluid outlet, the heat transfer fluid outlet fluidically coupled with the plurality of pipes via the outlet manifold.

3. The heat recovery system of claim 2, further comprising:
  a heat transfer fluid source fluidically coupled with the fluid inlet; and
  a heat transfer fluid reservoir fluidically coupled with the fluid outlet.

4. The heat recovery system of claim 3, wherein the heat transfer fluid reservoir is fluidically coupled with an external energy conversion system.

5. The heat recovery system of claim 4, wherein the heat transfer fluid source, the heat recovery apparatus, the heat transfer fluid reservoir, and the external energy conversion system form a closed-loop system.

6. The heat recovery system of claim 1, wherein the heat transfer fluid comprises a gas, a liquid or an aqueous solution.

7. The heat recovery system of claim 1, further comprising:
  a plurality of fourth sections fluidically coupled with the plurality of third sections via third branch points, the plurality of fourth sections configured to further divide the hot particulate from the second plurality of flow directions into a third plurality of flow directions toward the cavity; and
  a plurality of fifth sections fluidically coupled with the plurality of fourth sections via fourth branch points, the plurality of fifth sections configured to further divide the hot particulate from the third plurality of flow directions into a fourth plurality of flow directions toward the cavity.

8. A heat recovery apparatus comprising:
  a front side, a back side, a left side, a right side, a top, and a bottom;
  a particulate inlet located at the top of the heat recovery apparatus;
  a thermally insulated particulate distributor in fluid communication with the particulate inlet;
  a cavity in fluid communication with the particulate distributor, the cavity comprising a plurality of pipes extending from an inlet manifold located at the left side of the heat recovery apparatus to an outlet manifold located at the right side of the heat recovery apparatus, the plurality of pipes configured for transmission of a heat transfer fluid therethrough and direct transfer of heat from a hot particulate to the heat transfer fluid; and
  a particulate outlet located at the bottom of the heat recovery apparatus and in fluid communication with the cavity,
  wherein the particulate distributor comprises:
    a first section configured to receive hot particulate from the particulate inlet;
    a second section fluidically coupled with the first section via a first branch point and configured to deliver the hot particulate to the cavity, the second section configured to divide the hot particulate into a first plurality of flow directions toward the cavity; and
    a plurality of third sections fluidically coupled with the second section via second branch points, the plurality of third sections configured to further divide the hot particulate from the first plurality of flow directions into a second plurality of flow directions toward the cavity.

9. The heat recovery apparatus of claim 8, wherein the heat recovery apparatus is configured to couple with a support base via weight bearing members.

10. The heat recovery apparatus of claim 9, wherein the heat recovery apparatus is configured to couple with the weight bearing members via a plurality of elastically resilient members.

11. The heat recovery apparatus of claim 8, wherein the heat recovery apparatus is configured to couple with a mechanical shaker or agitator.

12. The heat recovery apparatus of claim 8, further comprising:
  a heat transfer fluid inlet, the heat fluid transfer inlet fluidically coupled with the plurality of pipes via the inlet manifold; and
  a heat transfer fluid outlet, the heat transfer fluid outlet fluidically coupled with the plurality of pipes via the outlet manifold.

13. A method for recovering heat from hot particulate, the method comprising:
  delivering a hot particulate to a heat recovery apparatus according to claim 8;
  circulating a heat transfer fluid through the plurality of pipes;
  distributing, with the particulate distributor, the hot particulate over the plurality of pipes;
  transferring heat from the hot particulate to the circulating heat transfer fluid through the plurality of pipes; and
  removing cooled particulate from the heat recovery apparatus through the particulate outlet.

14. The method of claim 13, wherein the hot particulate is granulated slag having a temperature ranging from about 700° C. to about 1100° C., sand having a temperature ranging from about 600° C. to about 1000° C., or a ceramic composition having a temperature ranging from about 600° C. to about 1000° C.

15. The method of claim 13, further comprising:
  shaking the heat recovery apparatus.

16. The method of claim 13, wherein the heat recovery apparatus further comprises:
  a heat transfer fluid inlet, the heat transfer fluid inlet fluidically coupled with the plurality of pipes via the inlet manifold; and
  a heat transfer fluid outlet, the heat transfer fluid outlet fluidically coupled with the plurality of pipes via the outlet manifold.

17. The method of claim 16, wherein the heat recovery apparatus further comprises:

a heat transfer fluid source fluidically coupled with the fluid inlet; and a heat transfer fluid reservoir fluidically coupled with the fluid outlet.

18. The method of claim 17, wherein the heat transfer fluid reservoir is fluidically coupled with an external energy conversion system.

19. The method of claim 18, further comprising transmitting the heat transfer fluid from the heat transfer fluid reservoir to the external energy conversion system.

20. The method of claim 18, wherein the heat transfer fluid source, the heat recovery apparatus, the heat transfer fluid reservoir, and the external energy conversion system form a closed-loop system.

21. The method of claim 20, further comprising transmitting the heat transfer fluid from the external energy conversion system to the heat transfer fluid source.

22. The method of claim 13, wherein the heat transfer fluid comprises a gas, a liquid or an aqueous solution.

23. The heat recovery apparatus of claim 8, further comprising:

a plurality of fourth sections fluidically coupled with the plurality of third sections via third branch points, the plurality of fourth sections configured to further divide the hot particulate from the second plurality of flow directions into a third plurality of flow directions toward the cavity; and a plurality of fifth sections fluidically coupled with the plurality of fourth sections via fourth branch points, the plurality of fifth sections configured to further divide the hot particulate from the third plurality of flow directions into a fourth plurality of flow directions toward the cavity.

* * * * *